United States Patent
Wohlgemuth et al.

(10) Patent No.: US 7,395,454 B1
(45) Date of Patent: Jul. 1, 2008

(54) INTEGRATED CIRCUIT WITH INTEGRATED DEBUGGING MECHANISM FOR STANDARD INTERFACE

(75) Inventors: Aron Wohlgemuth, Sunnyvale, CA (US); Amir Gabai, Modii'n, IL (US); Amit Avivi, Sunnyvale, CA (US)

(73) Assignee: Marvell Israel (MISL) Ltd., Yokneam (IL)

( * ) Notice: Subject to any disclaimer, the term of this patent is extended or adjusted under 35 U.S.C. 154(b) by 531 days.

(21) Appl. No.: 11/028,687

(22) Filed: Jan. 4, 2005

(51) Int. Cl.
*G06F 11/00* (2006.01)

(52) U.S. Cl. ...................................................... 714/30
(58) Field of Classification Search .................... 714/30
See application file for complete search history.

(56) References Cited

U.S. PATENT DOCUMENTS

| | | | |
|---|---|---|---|
| 5,544,311 A | 8/1996 | Harenberg et al. | |
| 5,983,017 A * | 11/1999 | Kemp et al. | 717/129 |
| 6,094,729 A | 7/2000 | Mann | |
| 6,134,652 A * | 10/2000 | Warren | 712/227 |
| 6,185,732 B1 * | 2/2001 | Mann et al. | 717/128 |
| 6,279,103 B1 * | 8/2001 | Warren | 712/227 |
| 6,353,563 B1 | 3/2002 | Hii et al. | |
| 6,430,727 B1 * | 8/2002 | Warren | 716/4 |
| 6,446,164 B1 | 9/2002 | Nguyen et al. | |
| 6,687,855 B1 | 2/2004 | Krech, Jr. et al. | |
| 6,760,865 B2 | 7/2004 | Ledford et al. | |
| 6,760,867 B2 | 7/2004 | Floyd et al. | |
| 6,766,468 B2 | 7/2004 | Barth, Jr. et al. | |
| 6,834,360 B2 * | 12/2004 | Corti et al. | 714/37 |
| 7,010,736 B1 * | 3/2006 | Teh et al. | 714/733 |
| 7,197,671 B2 * | 3/2007 | Swaine et al. | 714/45 |
| 7,237,149 B2 * | 6/2007 | Moyer et al. | 714/30 |
| 2002/0199136 A1 | 12/2002 | Ku | |
| 2003/0191624 A1 * | 10/2003 | Morigaki et al. | 703/28 |
| 2003/0226081 A1 * | 12/2003 | Fujiuchi | 714/733 |
| 2004/0153802 A1 * | 8/2004 | Kudo et al. | 714/30 |
| 2006/0248396 A1 * | 11/2006 | Swoboda | 714/30 |

\* cited by examiner

*Primary Examiner*—Bryce P Bonzo

(57) ABSTRACT

A circuit having a corresponding method comprises one or more circuits each to produce one or more status signals, wherein each of the status signals represents a status of a respective one of the one or more circuits; a memory; a memory controller to store a plurality of samples of the one or more status signals in the memory; a plurality of input/output terminals; an interface in communication with one or more of the input/output terminals; and a debug circuit to transfer the one or more samples of the status signals from the memory to the interface.

44 Claims, 6 Drawing Sheets

INTEGRATED CIRCUIT WITH INTEGRATED DEBUGGING MECHANISM FOR STANDARD INTERFACE

BACKGROUND

The present invention relates generally to integrated circuits having built-in self-test capabilities. More particularly, the present invention relates to an integrated circuit with an integrated debugging mechanism for a standard interface such as an Ethernet port, a PCI bus, and the like.

FIG. 1 shows a conventional integrated circuit 100 with an integrated debugging mechanism. Integrated circuit 100 comprises one or more debug input/output (I/O) terminals 108 and a debug circuit 102 connected to one or more circuits to be tested 104A through 104N by an optional multiplexer 106. One disadvantage of integrated circuit 100 is that an expensive piece of test equipment is required to interface with debug circuit 102 to collect status signals from circuits 104 via I/O terminals 108. In addition, the I/O terminals 108 that are dedicated to obtaining the status signals from integrated circuit 100 are generally wired to a connector only on special circuit boards used only for testing. Production circuit boards for such integrated circuits generally do not include a connector wired to I/O terminals 108. Therefore integrated circuit 100 cannot be tested on the production board.

SUMMARY

In general, in one aspect, the invention features a circuit and corresponding method. It comprises one or more circuits each to produce one or more status signals, wherein each of the status signals represents a status of a respective one of the one or more circuits; a memory; a memory controller to store a plurality of samples of the one or more status signals in the memory; a plurality of input/output terminals; an interface in communication with one or more of the input/output terminals; and a debug circuit to transfer the one or more samples of the status signals from the memory to the interface.

Particular implementations can include one or more of the following features. The circuit is formed on a common die. To transfer the one or more samples of the status signals to the interface, the debug circuit sends a message to the interface, wherein the message represents the one or more samples of the status signals. The message is an Ethernet packet. The circuit further comprises a multiplexer to pass selected ones of the status signals to the memory controller according to a select signal produced by the debug circuit. The debug circuit receives a message and selects the status signals according to the message. At least one of the circuits produces two or more of the status signals and comprises a multiplexer to pass selected ones of the two or more of the status signals to the memory controller according to a select signal produced by the debug circuit. At least one of the circuits comprises a register to store the status signals produced by the at least one of the circuits. The debug circuit receives a message and selects the plurality of samples of the one or more status signals according to the message. A circuit diagnostic system comprises the circuit of claim 1; and a host to receive the one or more samples of the status signals from the interface.

The details of one or more implementations are set forth in the accompanying drawings and the description below. Other features will be apparent from the description and drawings, and from the claims.

Figure 1:
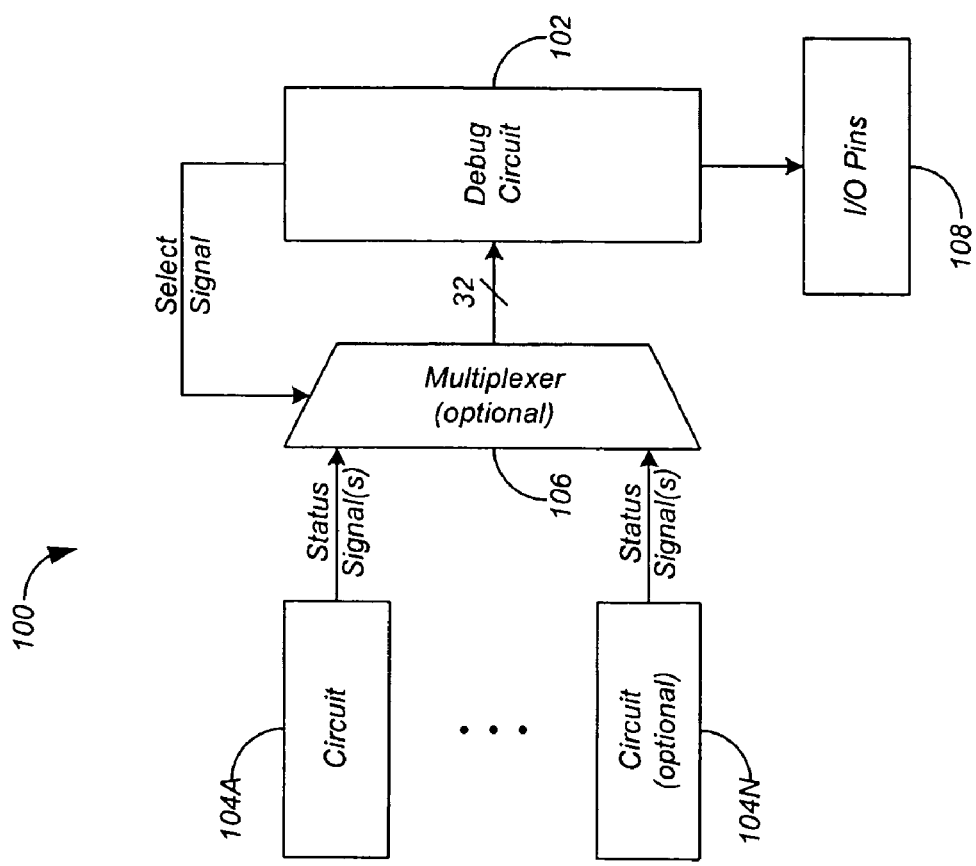
FIG. 1 shows a conventional integrated circuit 100 an integrated debugging mechanism.

The leading digit(s) of each reference numeral used in this specification indicates the number of the drawing in which the reference numeral first appears.

DETAILED DESCRIPTION

Embodiments of the present invention provide an integrated circuit with an integrated debugging mechanism that communicates with a standard interface such as an Ethernet port, a Peripheral Component Interconnect (PCI) bus, a PCI Express interface, a serial ATA interface, a Wi-Fi interface, a Firewire interface, a USB interface, an InfiniBand interface, an $I^2C$ interface, an SMI interface, and the like. For integrated circuits that already include such an interface, no additional I/O terminals are needed for debugging, and an appropriate connector is already included on the production circuit board for the integrated circuit. In addition, an integrated circuit having a network interface can be directly connected to a network to be debugged remotely.

Figure 2:
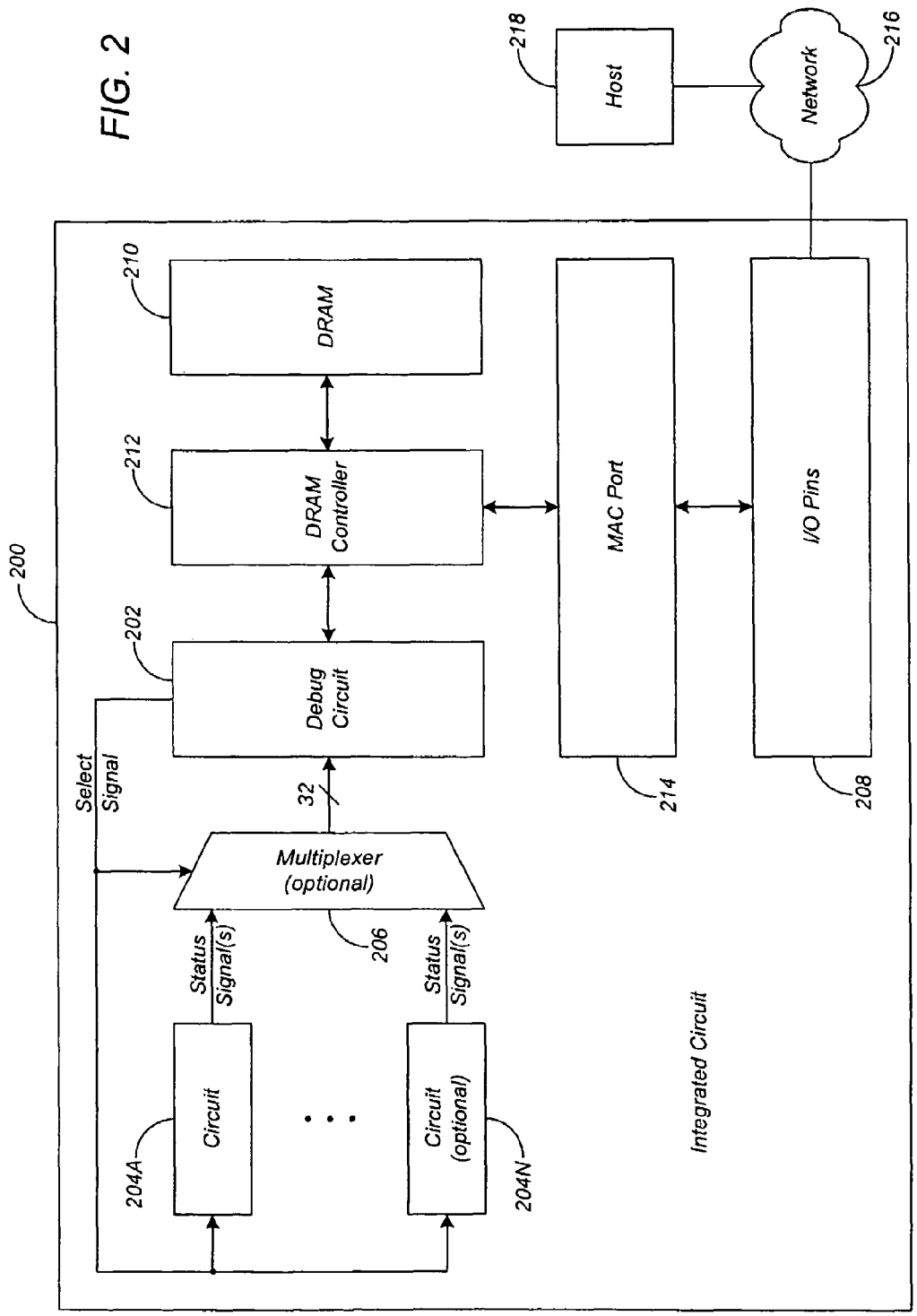
FIG. 2 shows an integrated circuit with an integrated debugging mechanism that communicates with an Ethernet port according to a preferred embodiment.

FIG. 2 shows a circuit diagnostic system comprising an integrated circuit 200 with an integrated debugging mechanism that communicates with a media access controller (MAC) port 214 according to a preferred embodiment. While embodiments of the present invention are described with reference to an Ethernet port, any other sort of standard network interface can be used, as will be apparent to one skilled in the relevant arts after reading this description. Integrated circuit 200 is shown in communication with a host 218 such as a personal computer (PC) over a network 216 such as a local-area network (LAN), although other sorts of networks and network devices can be used.

Integrated circuit 200 comprises a debug circuit 202 connected to one or more circuits to be tested 204A through 204N, preferably by an optional multiplexer 206. Preferably the connection is via a 32-bit bus, but of course other bus widths can be used. Integrated circuit 200 further comprises a plurality of input/output (I/O) terminals 208, a dynamic random-access memory (DRAM) 210, and a DRAM controller 212. Of course, other types of memory can be used in place of DRAM 210. Furthermore, DRAM 210 can be located either on integrated circuit 500 or on another integrated circuit.

Figure 3:
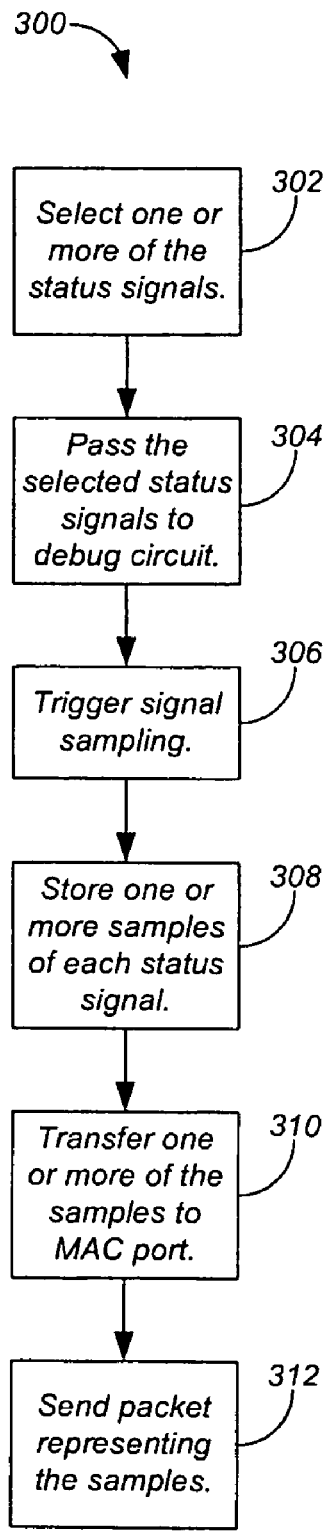
FIG. 3 shows a debugging process for the integrated circuit of FIG. 2 according to a preferred embodiment.

FIG. 3 shows a diagnostic process 300 for integrated circuit 200 according to a preferred embodiment. Circuits 204 represent circuits to be debugged by debug circuit 202. Each circuit 204 to be debugged provides one or more predetermined status signals to be monitored during debugging process 300, as is well-known in the relevant arts. Each status signal represents a status of the respective circuit 204. Debug circuit 202 selects one or more of the status signals by asserting a select signal (step 302). The status signals can be selected from one circuit 204 at a time, or from a plurality of circuits 204 simultaneously. In response to the select signal, multiplexer 206 passes the selected status signals to debug circuit 202 (step 304).

Figure 4:
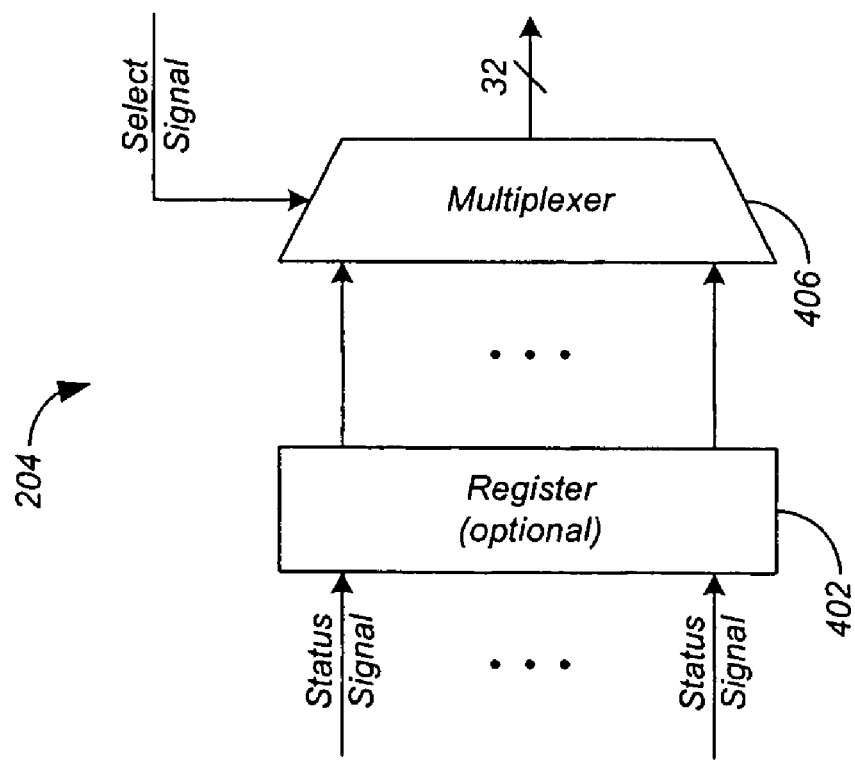
FIG. 4 shows detail of a circuit according to some embodiments.

In some embodiments, one or more of circuits 204 comprise an internal multiplexer responsive to the select signal in order to enable more status signals to be monitored. FIG. 4 shows detail of a circuit 204 according to some embodiments. According to these embodiments, circuit 204 comprises a multiplexer 406 that receives a plurality of status signals from within circuit 204, and passes one or more of the status signals in accordance with the select signal asserted by debug circuit 202. Circuit 204 optionally comprises a register 402 to store the status signals. Optional register 402 can be used with or without multiplexer 406.

Referring again to FIG. 3, debug circuit 202 triggers signal sampling with defined logic (step 306) and causes DRAM controller 212 to store one or more samples of each status signal passed by multiplexer 206 in DRAM 210 (step 308). The timing of the first sample and the number of the samples can be configured by host 218 by sending an Ethernet packet to debug circuit 202. For example, the timing of the first sample can be based on a selected transition of a selected signal in one of circuits 204 or the like, as is well-known in the relevant arts.

Debug circuit 202 subsequently transfers one or more of the samples of the status signals from DRAM 210 to MAC port 214 using DRAM controller 212 (step 310). For example, debug circuit 202 generates a descriptor for the stored samples, and transfers the descriptor to MAC port 214, which subsequently uses the descriptor to retrieve the samples from DRAM 210.

The samples to be transferred can be selected by host 218 by sending an Ethernet packet to debug circuit 202. The format of the samples to be transferred can also be selected by host 218. The samples can be transferred in any format, for example as a standard waveform viewing file such as a VCD file.

MAC port 214 generates an Ethernet packet representing the samples of the status signals, and sends the Ethernet packet (step 312). The destination address for the Ethernet packet representing the retrieved samples of the status signals can be selected by host 218 by sending an Ethernet packet to debug circuit 202.

Figure 5:
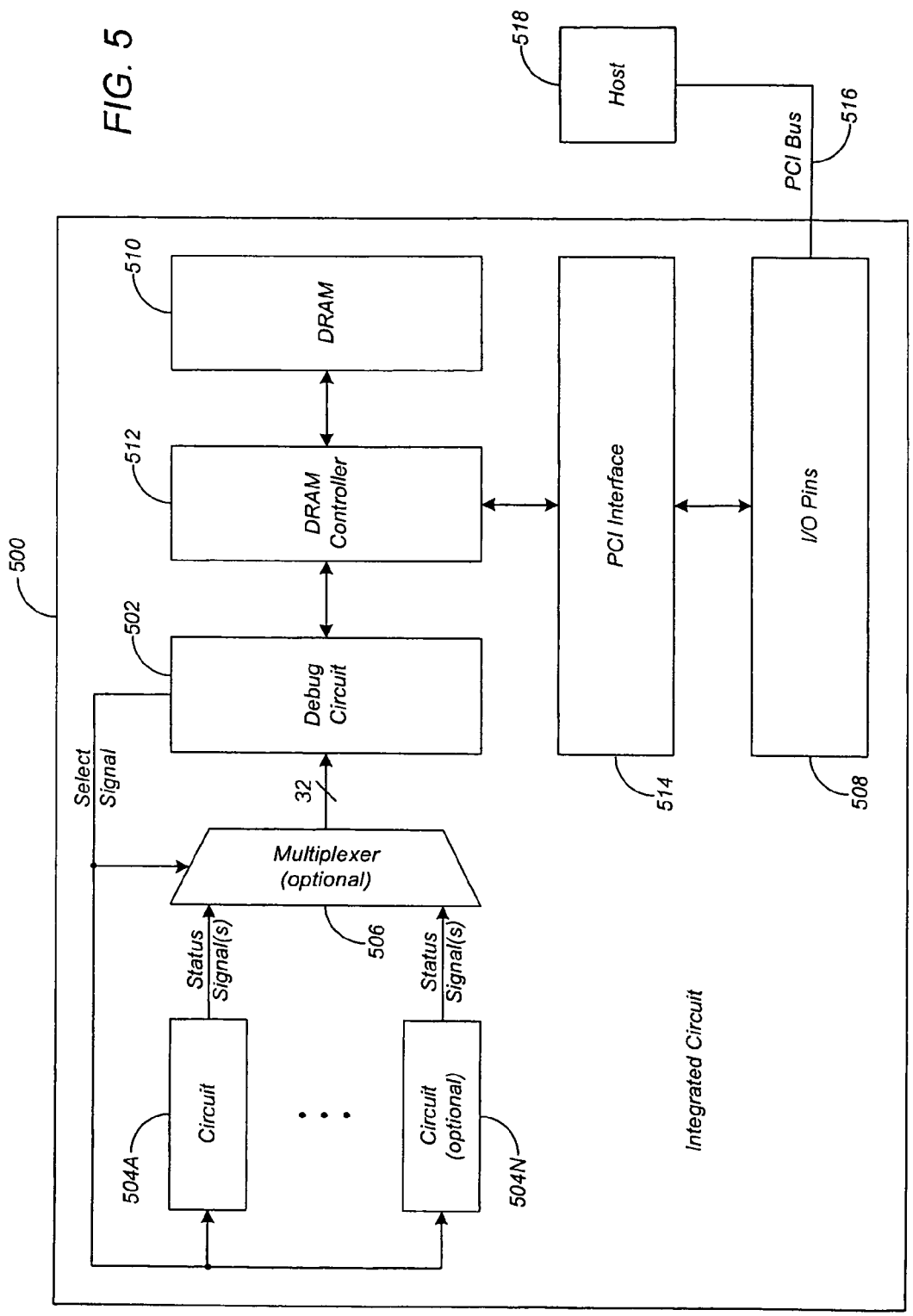
FIG. 5 shows an integrated circuit with an integrated debugging mechanism that communicates with a PCI interface according to a preferred embodiment.

FIG. 5 shows an integrated circuit 500 with an integrated debugging mechanism that communicates with a PCI interface 514 according to a preferred embodiment. While embodiments of the present invention are described with reference to a PCI bus, any other sort of standard interface can be used, as will be apparent to one skilled in the relevant arts after reading this description. Integrated circuit 500 is shown in communication with a host 518 such as a personal computer (PC) over a PCI bus 516, although other sorts of busses and devices can be used.

Integrated circuit 500 comprises a debug circuit 502 connected to one or more circuits to be tested 504A through 504N, preferably by an optional multiplexer 506. Preferably the connection is via a 32-bit bus, but of course other bus widths can be used. Integrated circuit 500 further comprises a plurality of input/output (I/O) terminals 508, a DRAM 510, and a DRAM controller 512. Of course, other types of memory can be used in place of DRAM 510. Furthermore, DRAM 210 can be located either on integrated circuit 500 or on another integrated circuit.

Figure 6:
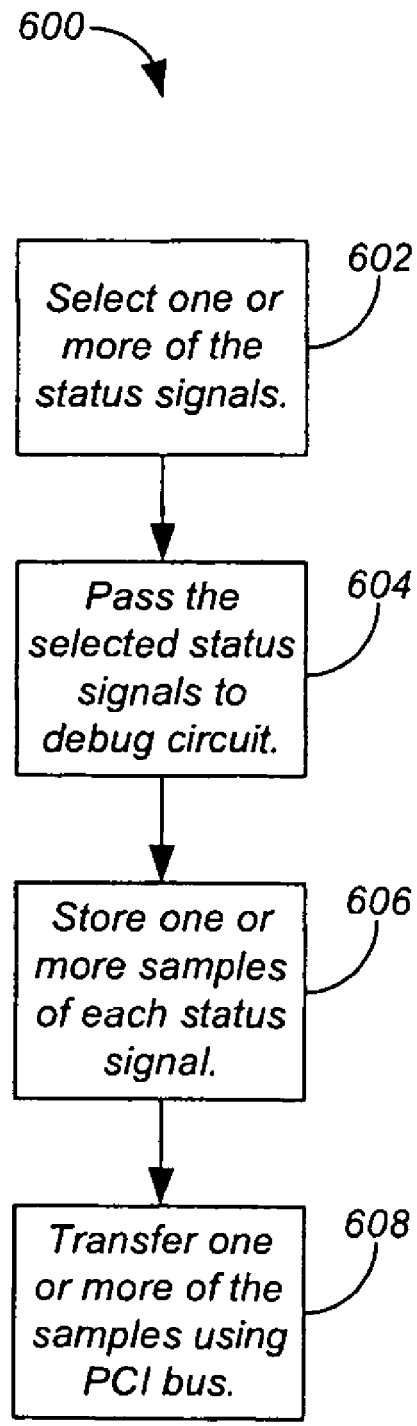
FIG. 6 shows a debugging process for the integrated circuit of FIG. 5 according to a preferred embodiment.

FIG. 6 shows a debugging process 600 for integrated circuit 500 according to a preferred embodiment. Circuits 504 represent circuits to be debugged by debug circuit 502. Each circuit 504 to be debugged provides one or more predetermined status signals to be monitored during debugging process 600, as is well-known in the relevant arts. Each status signal represents a status of the respective circuit 504. Debug circuit 502 selects one or more of the status signals by asserting a select signal (step 602). The status signals can be selected from one circuit 504 at a time, or from a plurality of circuits 504 simultaneously. In response to the select signal, multiplexer 506 passes the selected status signals to debug circuit 502 (step 604). In some embodiments, one or more of circuits 504 comprise an internal multiplexer responsive to the select signal to pass the selected status signals and/or an internal register to store the status signals, as discussed above with respect to FIG. 4.

Referring again to FIG. 5, debug circuit 502 causes DRAM controller 512 to store one or more samples of each status signal passed by multiplexer 506 in DRAM 510 (step 606). The timing of the first sample and the number of the samples can be configured by host 518 using PCI bus 516. For example, the timing of the first sample can be based on a selected transition of a selected signal in one of circuits 504 or the like, as is well-known in the relevant arts.

Debug circuit 502 transfers the samples of the status signals from DRAM 510 to host 518 over PCI bus 516 (step 608). For example, debug circuit 502 informs host 518 that the samples of the status signals are available in DRAM 510 by asserting an interrupt signal over PCI bus 516. Host 518 subsequently retrieves one or more of the samples of the status signals from DRAM 510. The samples to be transferred can be selected by host 518 using PCI bus 516. The format of the samples to be transferred can also be selected by host 518. The samples can be transferred in any format, for example as a standard waveform viewing file such as a VCD file.

The invention can be implemented in digital electronic circuitry, or in computer hardware, firmware, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A system comprising:
    a plurality of circuits under test that each produce one or more status signals,
    wherein each of the status signals represents a status of a respective one of the plurality of circuits;
    a memory;
    a memory controller to store samples of the one or more status signals in the memory;
    a plurality of input/output terminals;
    a host interface in communication with said memory controller and the input/output terminals and transferring said samples to a host; and
    a debug circuit that is coupled between said plurality of circuits and said memory controller and that transfers the samples from the memory to the host interface.

2. The system of claim 1, wherein the system is formed on a common die.

3. The system of claim 1 wherein to transfer the samples to the interface, the debug circuit sends a message to the interface,
    wherein the message represents the samples.

4. The system of claim 3 wherein the message is an Ethernet packet.

5. The system of claim 1, further comprising:
    a multiplexer to pass selected ones of the status signals to the memory controller according to a select signal produced by the debug circuit.

6. The system of claim 5 wherein the debug circuit receives a message and selects the status signals according to the message.

7. The system of claim 1 further comprising a multiplexer,
    wherein at least one of the plurality of circuits produces two or more of the status signals, and
    wherein said multiplexer passes selected ones of the two or more of the status signals to the memory controller according to a select signal produced by the debug circuit.

8. The system of claim 1 comprising a register to store the status signals.

9. The system of claim 1 wherein the debug circuit receives a message and selects the samples of the status signals according to the message.

10. A circuit diagnostic system comprising:
    the system of claim 1; and
    said host,
    wherein said host receives the samples from the interface.

11. The system of claim 1 wherein said host selects a format of said status signals, and
    wherein said debug circuit transfers the samples based on said format.

12. The system of claim 1 wherein said host selects a packet, and
    wherein said host interface generates said packet representing said samples and transfers said packet to said host.

13. The system of claim 1 wherein said memory controller converts said samples to a predetermined format selected from a plurality of formats before transfer to said host interface.

14. The system of claim 1 wherein said plurality of circuits under test is remotely debugged over a network via said host interface.

15. The system of claim 1 wherein said debug circuit generates a descriptor for said stored samples and transfers said descriptor to said host interface, and
    wherein said host interface retrieves said samples based on said descriptor.

16. The system of claim 1 wherein said host interface is coupled between said memory controller and said input/output terminals.

17. The system of claim 1 wherein said host interface includes a media access controller port.

18. The system of claim 1 wherein said host interface includes a peripheral component interconnect port.

19. The system of claim 1 wherein said debug circuit generates a select signal, and
    wherein said plurality of circuits under test generates said status signals based on said select signal.

20. The system of claim 1 wherein said memory controller is coupled between said memory and said debug circuit.

21. The system of claim 1 wherein said memory controller is coupled between said input/output terminals and said debug circuit.

22. The system of claim 1 wherein said multiplexer selects status signals from one of said plurality of circuits under test based on said select signal.

23. The system of claim 1 wherein said memory controller controls transfer of said samples from said memory to said host interface.

24. The system of claim 1 wherein said memory controller controls operation of said host interface and transfer of said samples to said host.

25. A system comprising:
    first and second means under test for producing status signals,
    wherein each of the status signals represents a status of a respective one of the first and second means;
    memory means for storing data;
    memory controller means for storing samples of the status signals in the memory means;
    input/output terminal means for passing signals;
    host interface means for communicating with the memory controller means and the input/output terminal means and for transferring said samples to a host; and
    debug means that is coupled between the memory controller means and the first and second means and that transfers the samples from the memory means to the host interface means.

26. The system of claim 25, wherein the system is formed on a common die.

27. The system of claim 25 wherein to transfer the samples to the interface means, the debug means sends a message to the interface means, and
    wherein the message represents the samples of the status signals.

28. The system of claim 27 wherein the message is an Ethernet packet.

29. The system of claim 25, further comprising multiplexer means for passing selected ones of the status signals to the memory controller means according to a select signal produced by the debug means.

30. The system of claim 29 wherein the debug means receives a message and selects the status signals according to the message.

31. The system of claim 25 wherein one of the first and second means produces two or more of the status signals and comprises a multiplexer means for passing selected ones of the two or more of the status signals to the memory controller means according to a select signal produced by the debug means.

32. The system of claim 25 wherein one of the first and second means comprises register means for storing the status signals produced by one of the first and second means.

33. The system of claim 25 wherein the debug means receives a message and selects the plurality of samples of the status signals according to the message.

34. A circuit diagnostic system comprising:
the system of claim 25; and
said host means,
wherein said host means receives the samples from the interface means.

35. A method comprising:
receiving a status signal from each of a plurality of circuits under test,
wherein each of the status signals represents a status of a respective one of the circuits under test;
storing samples of the status signals in a memory;
transferring said samples to a host; and
transferring the samples from the memory to a host interface via a debug circuit that is coupled between the circuits under test and a memory controller.

36. The method of claim 35, wherein transferring the samples comprises sending a message to the interface, and wherein the message represents the samples.

37. The method of claim 36:
wherein the message is an Ethernet packet.

38. The method of claim 35, further comprising selecting the status signals according to a select signal.

39. The method of claim 35, further comprising: receiving a message; and
selecting the samples according to the message.

40. A method for diagnosing a system comprising:
the method of claim 35, and
receiving the samples from the interface.

41. A system comprising:
a memory;
a plurality of communication terminals that communicate with a host that is remotely located from the system;
a plurality of circuits under test that each generate a test data signal;
a debug circuit that monitors said plurality of circuits under test and that samples said test data signals;
a memory controller that stores said samples in said memory; and
a host interface that communicates with the memory controller and that transfers said samples to said host via said communication terminals.

42. An integrated circuit comprising the system of claim 41.

43. The system of claim 41 wherein said host interface communicates with said host over a network.

44. The system of claim 41 wherein said test data signals comprise diagnostic data.

* * * * *

UNITED STATES PATENT AND TRADEMARK OFFICE
CERTIFICATE OF CORRECTION

| | |
|---|---|
| PATENT NO. | : 7,395,454 B1 |
| APPLICATION NO. | : 11/028687 |
| DATED | : July 1, 2008 |
| INVENTOR(S) | : Aron Wohlgemuth et al. |

It is certified that error appears in the above-identified patent and that said Letters Patent is hereby corrected as shown below:

Column 2, Line 3            Insert -- with -- after "100"

Signed and Sealed this

Twenty-third Day of September, 2008

JON W. DUDAS
*Director of the United States Patent and Trademark Office*